Patented Nov. 20, 1928.

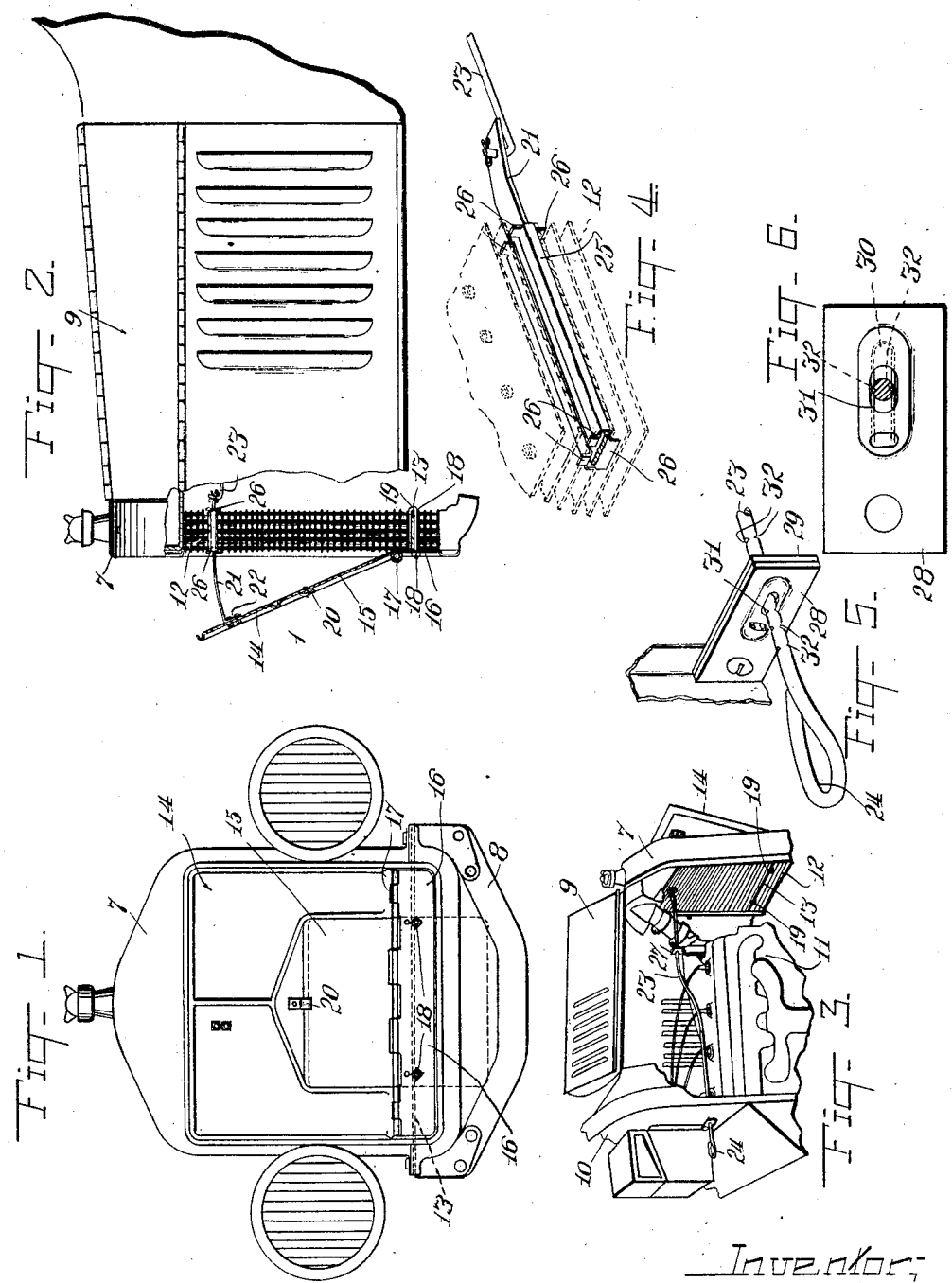

1,692,031

UNITED STATES PATENT OFFICE.

CARL H. GAMBLE, OF MOLINE, ILLINOIS, ASSIGNOR TO DEERE & COMPANY, OF MOLINE, ILLINOIS, A CORPORATION OF ILLINOIS.

APPARATUS FOR CONTROLLING THE VENTILATION OF AUTOMOBILE RADIATORS.

Application filed March 21, 1925. Serial No. 17,176.

My invention relates to apparatus for controlling the ventilation of automobile radiators. When driving an automobile in winter, or when the car is left standing in severe weather, it is desirable that the front face of the radiator be entirely covered to cut off the flow of air therethrough, so that the water may be kept warm enough to cause the motor to operate efficiently, and there will be less danger of freezing, whereas in milder weather to prevent overheating more or less of the front surface of the radiator, depending on circumstances, should be exposed to the air, and my invention has for its object to provide an improved ventilating apparatus by which the flow of air through the radiator may be readily and accurately controlled by the driver from his seat; which may be easily and quickly attached to a radiator, and which will be cheap to manufacture. I accomplish this object as illustrated in the accompanying drawings and as hereinafter described. What I believe to be new is set forth in the claims.

In the drawings,—

Fig. 1 is a front elevation of part of an automobile with my improved ventilating apparatus in closed position on the front face of the radiator;

Fig. 2 is a side elevation of part of the front end portion of an automobile showing the ventilating apparatus in partly open position, the ventilating apparatus and most of the radiator being in section;

Fig. 3 is a perspective view of a portion of the forward part of an automobile, showing the means by which the ventilator may be adjusted from the driver's seat;

Fig. 4 is an enlarged perspective view illustrating in dotted lines a portion of the radiator, and in full lines a metal sleeve introduced between the sections thereof to form a bearing for an operating rod which extends therethrough, a portion of which is also shown;

Fig. 5 is a perspective view illustrating the means for locking the operating rod in its different positions of adjustment; and Fig. 6 is a front elevation of the locking device, with the operating rod in section.

Referring to the drawings,—7 indicates a radiator casing, and 8 a portion of the front frame of an automobile, to which said casing is secured in any suitable manner. The engine hood is indicated as a whole by the reference numeral 9, the dashboard by 10, and the engine by 11. The radiator proper is indicated by 12, and, as shown in full lines in Fig. 2 and by dotted lines in Fig. 1, it is provided with a reenforcing member in the form of a plate 13 that extends horizontally from one side to the other of the radiator near the lower margin thereof.

Coming now to a description of my improved ventilating apparatus, it comprises a main door or shutter 14 of suitable dimensions to fit accurately over the reticulated portion of the front of the radiator, as shown in Fig. 1. In the lower central portion of this shutter is an opening, preferably rectangular in form and of somewhat less width than the shutter, that extends upwardly from the lower margin of the shutter, which opening is adapted to be closed by a second narrower door or shutter 15, as shown in Fig. 1. The arrangement of the opening is such that the lower side portions of the shutter 14, which portions are of considerable width, lie between the side margins of the smaller shutter 15 and the adjacent edges of the radiator and overlie the front of the radiator at those points so that when the smaller shutter is opened and the larger shutter closed, as hereinafter described, the side portions of the radiator are protected from contact with the incoming cool air and the cooling effect is realized mostly at the central part of the radiator. Both these shutters are best made of sheet metal. The two shutters 14, 15 are hinged to swing about a common horizontal axis, so that they may be moved toward or from the radiator front, this being best accomplished by hinging them along their lower margins to a base plate 16, best shown in Figs. 1 and 2. Preferably a single hinge 17 which extends across said base plate from one side to the other, is used for this purpose. The two shutters may therefore be connected to swing together as one, or either shutter may be adjusted separately, as hereinafter described.

The base plate 16 is secured to the lower portion of the front face of the radiator 12 by means of U-bolts 18 the heads of which pass through suitable holes in said base plate, while the loop portions 19 thereof extend through the radiator 12 and embrace the reenforcing member 13, as shown in Fig. 2. By this means the base plate 16 is securely attached to the radiator without danger of damaging it. The main shutter 14 is provided with a turn button 20, centrally disposed above the opening therein, which is adapted to be turned down over the upper margin of the small shutter when it is in position to close said opening, to hold it in closed position, and cause the two shutters to move in unison when adjusted. The shutters may however be arranged for separate adjustment by turning the turn button 20 upward out of engagement with the shutter 15, which allows such shutter to turn down on the hinge 17 to the position shown in dotted lines in Fig. 1, independently of the shutter 14.

When it is desired to expose the entire front surface of the radiator to the air to a greater or less extent, as in mild winter weather, that may be accomplished by means operable from the driver's seat, comprising a flat flexible metal strip 21 suitably secured at its forward end to the inner face of the main shutter 14, near the upper edge thereof, as shown at 22 in Fig. 2, and extending rearwardly through the radiator and having its rear end connected to an operating rod 23. The rod 23 extends rearwardly through an opening in the dashboard of the automobile and is provided with a handle portion 24 on its rear end.

To prevent the flat strip 21 from wearing on the fins or tubes of the radiator and guide it as it moves back and forth, and also to keep it from buckling I provide a flattened guide sleeve 25 which extends through the radiator and is fixedly secured thereto, as shown in Figs. 2 and 4. Said sleeve is secured in position by making the ends thereof in the form of clips 26 which are turned outwardly at an angle to the main body portion of the sleeve to abut against the front and rear faces of the radiator, as shown in said figures. By this construction the sleeve may readily be applied to the radiator, and is securely held against endwise movement. A guide 27 is provided for the intermediate portion of the rod 23, which guide is suitably secured to the engine, as shown in Fig. 3.

It will be apparent from the foregoing description that by pushing or pulling on the rod 23 the driver can open or close the shutter 14 to any desired extent within its range of adjustment, and to hold it in the desired position I provide the rod 23 with locking means mounted on the dashboard. Such locking means comprises two plates 28, 29 placed face to face and having a hairpin spring 30 suitably positioned in a recess between said plates, as shown in Fig. 6. The rod 23 passes through alined openings 31 in said plates, and said rod is provided with a plurality of notches 32 suitably spaced apart, that are adapted to be engaged by the arms of the spring 30 to hold said rod in its different positions of adjustment, as will be readily understood.

From the foregoing description it will be obvious that when desired the radiator may be kept completely covered by locking the shutter 15 to the shutter 14 by means of the turn button 20, and swinging the shutter 14 into closed position against the face of the radiator by pulling on the rod 23, which rod will be held in the desired position by the engagement of the spring 30 with the proper notch 32 in said rod. After the engine has become warmed up, or should the weather become milder, if it be desired to open the ventilating apparatus to expose the whole face of the radiator more or less freely to the air, this may be accomplished by the driver from his seat by pushing on the rod 23 until the shutter is opened to the desired extent, when it will be held in its adjusted position by the spring 30. When it is desired to expose only a small portion of the radiator to the air the rod 23 is allowed to remain locked in position to hold the shutter 14 closed against the face of the radiator, and the turn button 20 is turned up to allow the shutter 15 to drop to the position shown in dotted lines in Fig. 1. As the opening covered by the smaller shutter is located at the lower central portion of the radiator and the side portions thereof are covered by the downwardly extending portions of the large shutter the cooling effect of the incoming air is directed to the water at the central portion of the radiator rather than at its marginal portions where it is more apt to freeze. Consequently, the cooling of the water may be accomplished without reducing its temperature to a dangerous point.

It is evident that the ventilating apparatus described is very simple and inexpensive in construction; and that it may be easily applied to an automobile without removing or disturbing any of its parts. Nevertheless it provides for convenient adjustment through a range ample to meet the most exacting conditions.

What I claim as my invention and desire to secure by Letters Patent, is—

1. A ventilating apparatus for automobile radiators comprising a base plate adapted to be secured to the lower portion of a radiator, a shutter hinged to said base plate to swing toward and from the face of the radiator and having an opening therein somewhat less in width than the shutter, a smaller shutter for said opening hinged to swing toward and from said first-mentioned shutter to open or close said opening, and means for securing said shutters together to swing in unison.

2. A ventilating apparatus for automobile radiators comprising a base plate adapted to be secured to the lower portion of a radiator, a shutter having side portions hinged to said base plate to swing toward and from the face of the radiator and providing an opening in said shutter extending upward from its lower margin, a smaller shutter hinged to said base plate coaxially with and between the side portions of the larger shutter and adapted to close said opening, and means for securing said shutters together to swing in unison.

3. A ventilating apparatus for automobile radiators, comprising a base plate adapted to be secured to the lower portion of a radiator, a shutter hinged to said base plate to swing toward and from the face of the radiator and having an opening therein, somewhat less in width than the shutter, and a smaller shutter for said opening hinged to swing toward and from said first-mentioned shutter to open or close said opening.

4. A ventilating apparatus for automobile radiators comprising a base plate adapted to be secured to the lower portion of a radiator, and a pair of shutters hinged co-axially to said base plate to swing toward or from the face of the radiator, one of said shutters extending around the upper and side margins of the other and having an opening adapted to be closed by the latter shutter.

CARL H. GAMBLE.